(12) United States Patent
Kawashima et al.

(10) Patent No.: US 10,202,022 B2
(45) Date of Patent: Feb. 12, 2019

(54) ELECTRICALLY-DRIVEN COMPRESSOR FOR VEHICLE

(71) Applicant: KABUSHIKI KAISHA TOYOTA JIDOSHOKKI, Kariya-shi, Aichi-ken (JP)

(72) Inventors: Takashi Kawashima, Kariya (JP); Yoshiki Nagata, Kariya (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 159 days.

(21) Appl. No.: 15/285,599

(22) Filed: Oct. 5, 2016

(65) Prior Publication Data

US 2017/0096049 A1 Apr. 6, 2017

(30) Foreign Application Priority Data

Oct. 6, 2015 (JP) .................. 2015-198387

(51) Int. Cl.
F04C 18/02 (2006.01)
B60H 1/32 (2006.01)
H02P 27/08 (2006.01)
F04C 28/08 (2006.01)
(Continued)

(52) U.S. Cl.
CPC ......... *B60H 1/3222* (2013.01); *B60H 1/3223* (2013.01); *F04C 18/0215* (2013.01); *F04C 28/08* (2013.01); *H02P 21/26* (2016.02); *H02P 27/08* (2013.01); B60H 2001/3238 (2013.01); B60H 2001/3272 (2013.01); B60H 2001/3292 (2013.01); F04C 18/0207 (2013.01); F04C 29/0085 (2013.01); F04C 2240/40 (2013.01); F04C 2240/808 (2013.01); (Continued)

(58) Field of Classification Search
CPC .................. F04C 28/08; F04C 2270/80; F04C 2240/808; F04C 2270/605; F04C 2270/075
See application file for complete search history.

(56) References Cited

U.S. PATENT DOCUMENTS

2010/0039056 A1 2/2010 Kobayashi et al.

FOREIGN PATENT DOCUMENTS

| JP | 5-184157 A | 7/1993 |
|---|---|---|
| JP | 2010-183702 A | 8/2010 |
| JP | 2014-212606 A | 11/2014 |

(Continued)

OTHER PUBLICATIONS

Written Opinion of KIPO, Korean Patent App. No. KR2016-124911 A, opinion dated Mar. 28, 2018 (translated into English).*

Primary Examiner — Patrick Hamo
(74) Attorney, Agent, or Firm — Sughrue Mion, PLLC

(57) ABSTRACT

When the magnitude of a motor current Iu is smaller than a threshold value at a timing when a polarity of the motor current Iu is expected to be reversed after the elapse of one control cycle, a control device sets a correction amount of a width of a pulse generated by PWM control at a correction amount +α. When the magnitude of the motor current is greater than the threshold value at the timing, the control device sets the correction amount of the width of the pulse generated by the PWM control at zero or a value β smaller than the correction amount +α. As a result, an error of a dead time period in inverter control can be reduced.

4 Claims, 7 Drawing Sheets

(51) Int. Cl.
*H02P 21/26* (2016.01)
*F04C 29/00* (2006.01)

(52) U.S. Cl.
CPC .. *F04C 2270/075* (2013.01); *F04C 2270/605* (2013.01); *F04C 2270/80* (2013.01)

(56) References Cited

FOREIGN PATENT DOCUMENTS

JP         2015-80294 A     4/2015
WO     2008/053538 A1   5/2008

* cited by examiner

ELECTRICALLY-DRIVEN COMPRESSOR FOR VEHICLE

This nonprovisional application is based on Japanese Patent Application No. 2015-198387 filed on Oct. 6, 2015 with the Japan Patent Office, the entire contents of which are hereby incorporated by reference.

BACKGROUND OF THE INVENTION

Field of the Invention

The present invention relates to an electrically-driven compressor for vehicle, and particularly to control of an inverter that drives a motor of the compressor.

Description of the Background Art

An electrically-driven compressor mounted on a vehicle includes an inverter device for controlling a motor that drives the compressor. Such inverter device controls an output current by the high-frequency switching operation of switching elements and thereby controls the rotation speed of the motor. The inverter device outputs the current to coils of the motor by pulse width modulation (PWM) control.

In order to prevent a short circuit caused by the switching elements in upper and lower arms being simultaneously turned on, the dead time is provided to various drive signals for the switching elements used in the inverter device executing the PWM control.

During the dead time period, the switching elements in the upper arm and the switching elements in the lower arm are both turned off, and thus, an intended voltage is not applied to the motor. Therefore, an error occurs in a voltage output applied to the motor, which adversely affects the motor operation control.

Therefore, a method for correcting the voltage output during the dead time period as described in Japanese Patent Laying-Open No. 5-184157, WO2008/053538, Japanese Patent Laying-Open Nos. 2014-212606 and 2015-80294 is under study.

The error of the voltage output occurring during the dead time period depends on the direction of a motor current flowing during the dead time. Therefore, correction of the dead time in accordance with the motor current is needed.

On the other hand, reduction in size is required in the vehicle-mounted compressor, and thus, the motor of the compressor must also be rotated at high speed for the same work. If the motor is PWM controlled with the same control cycle as a control cycle at the time of low-speed rotation, the number of control cycles per rotation is reduced at the time of high-speed rotation, which leads to coarse control.

At the time of high-speed rotation, the error occurring during the dead time period has a great influence. Specifically, a voltage waveform in the PWM control has the large number of pulses per rotation at the time of low-speed rotation, and thus, recovery is possible during one rotation even when there is an error in one pulse. In contrast, the number of pulses per rotation is smaller at the time of high-speed rotation. Therefore, when there is an error in one pulse, the error has a great influence on the rotation control and distortion of rotation occurs, for example.

Therefore, when dead time correction is made as usual without exception, the error occurring during the dead time period may have a great influence on rotation.

Shortening the control cycle is also conceivable. However, due to efficiency of the hardware such as a CPU, there are limitations on shortening the control cycle.

SUMMARY OF THE INVENTION

An object of the present invention is to provide an electrically-driven compressor for a vehicle in which an error of a voltage waveform occurring during a dead time period in inverter control can be reduced.

In summary, the present invention is directed to an electrically-driven compressor for a vehicle including: a motor; a refrigerant compressing unit driven by the motor; an inverter for driving the motor; and a control device for controlling the inverter by PWM control. When the magnitude of a current of the motor is smaller than a threshold value at a control timing, the control device sets a correction amount of a width of a pulse generated by the PWM control at a first correction amount, the control timing being a timing when a polarity of the current of the motor is reversed after the elapse of one control cycle. When the magnitude of the current of the motor is greater than the threshold value at the control timing, the control device sets the correction amount of the width of the pulse generated by the PWM control at zero or a value smaller than the first correction amount.

When the magnitude of the motor current is smaller than the threshold value at the control timing, the phase at the control timing is close to a zero-crossing point within one control cycle, and thus, correction may be made with the first correction amount which is a standard value. On the other hand, when the magnitude of the motor current is greater than the threshold value, the phase at the control timing is far from the zero-crossing point within one control cycle, and thus, a voltage error of a voltage applied to the motor is great if correction is made with the first correction amount which is a standard value. Thus, when the magnitude of the motor current is greater than the threshold value, correction is not made or the correction amount is set to be smaller than the first correction amount, and as a result, the voltage error can be suppressed small.

According to the present invention, the error occurring during the dead time period in the inverter control can be reduced, and thus, the operation of the compressor at the time of high-speed rotation is stabilized.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
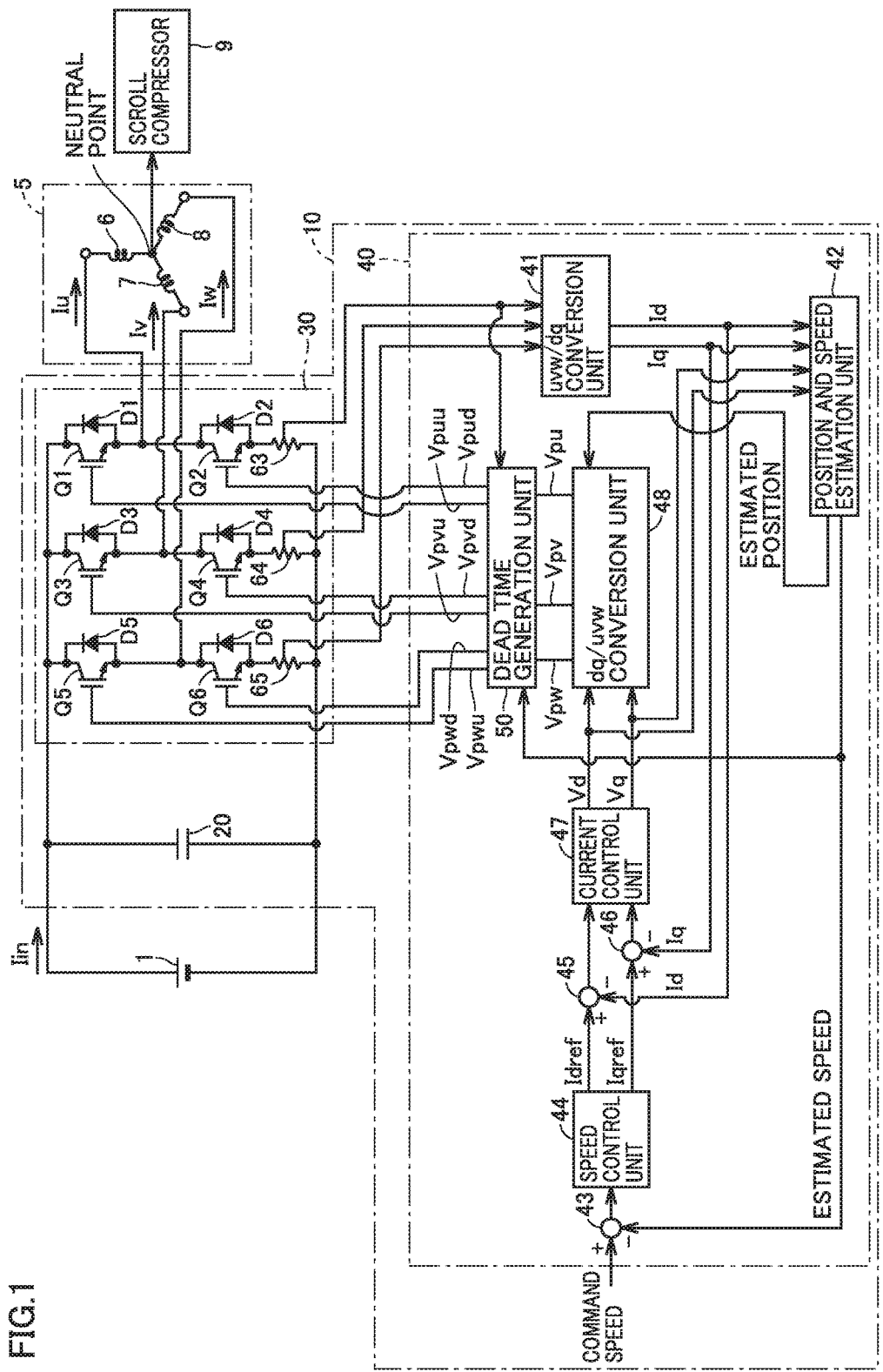
FIG. 1 is a circuit diagram showing a configuration of an electrically-driven compressor according to the present embodiment.

An embodiment of the present invention will be described in detail hereinafter with reference to the drawings, in which the same or corresponding portions are denoted by the same reference characters, and description thereof will not be repeated.

[Overall Configuration]

FIG. 1 is a circuit diagram showing a configuration of an electrically-driven compressor according to the present embodiment. Referring to FIG. 1, the electrically-driven compressor includes a motor 5, an inverter device 10, and a scroll compressor 9 driven by the motor 5.

The inverter device 10 receives electric power from a battery 1 serving as a DC power supply, and drives and controls the motor 5. The motor 5 is a three-phase synchronous AC motor and is used, for example, as a motor for an air conditioner (a motor for an air conditioner compressor) of a car. The inverter device 10 includes a capacitor 20, an inverter circuit 30 and a motor control unit 40.

One terminal of the capacitor 20 and a positive power line of the inverter circuit 30 are connected to a positive terminal of the battery 1. The other terminal of the capacitor 20 and a negative power line of the inverter circuit 30 are connected to a negative terminal of the battery 1. The DC electric power is supplied from the battery 1 through the capacitor 20 to the inverter circuit 30.

The inverter circuit 30 includes switching elements Q1 to Q6, diodes D1 to D6, and shunt resistors 63 to 65. An IGBT (Insulated Gate Bipolar Transistor) can, for example, be used as each of the switching elements Q1 to Q6. Between the positive power line and the negative power line, the switching elements Q1 and Q2 for a U phase and the shunt resistor 63 are serially connected, the switching elements Q3 and Q4 for a V phase and the shunt resistor 64 are serially connected, and the switching elements Q5 and Q6 for a W phase and the shunt resistor 65 are serially connected. The diodes D1 to D6 are connected in antiparallel with the switching elements Q1 to Q6, respectively. Coils 6, 7 and 8 of the respective phases of the motor 5 are connected to a connection node between the switching elements Q1 and Q2, a connection node between the switching elements Q3 and Q4, and a connection node between the switching elements Q5 and Q6, respectively. The coils 6, 7 and 8 are Y-connected.

The current flowing through the motor 5 can be detected based on the voltages of the shunt resistors 63 to 65.

The motor control unit 40 executes vector control of the motor 5. The motor control unit 40 includes a uvw/dq conversion unit 41, a position and speed estimation unit 42, a subtractor 43, a speed control unit 44, subtractors 45 and 46, a current control unit 47, and a dq/uvw conversion unit 48.

A command speed of the motor 5 is input to the subtractor 43 of the motor control unit 40 from outside. The motor control unit 40 drives the inverter circuit 30 by the vector control in accordance with the command speed.

The uvw/dq conversion unit 41 calculates an excitation component current Id and a torque component current Iq converted into a d-axis coordinate and a q-axis coordinate on a rotor shaft in the motor 5, respectively, based on the current values detected at the shunt resistors 63 to 65. The calculated excitation component current Id and torque component current Iq are input to the position and speed estimation unit 42. In addition the calculated excitation component current Id is input to the subtractor 45. Furthermore, the calculated torque component current Iq is input to the subtractor 46.

Based on the excitation component current Id, the torque component current Iq, an excitation component voltage Vd, and a torque component voltage Vq, the position and speed estimation unit 42 calculates an estimated rotor speed in the motor 5 and calculates an estimated rotor position. The calculated estimated rotor speed is input to the subtractor 43. In addition, the calculated estimated rotor position is supplied to the dq/uvw conversion unit 48.

The subtractor 43 subtracts the estimated rotor speed from the command speed. The speed control unit 44 receives a difference between the command speed and the estimated speed from the subtractor 43, and calculates a limit value Idref for the excitation component current Id and a limit value Iqref for the torque component current Iq. The limit value Idref for the excitation component current Id is input to the subtractor 45. In addition, the limit value Iqref for the torque component current Iq is input to the subtractor 46.

The subtractor 45 subtracts the excitation component current Id from the limit value Idref. This subtraction result is input to the current control unit 47. In addition, the subtractor 46 subtracts the torque component current Iq from the limit value Iqref. This subtraction result is input to the current control unit 47.

Based on a difference between the limit value Idref and the excitation component current Id, the current control unit 47 calculates the excitation component voltage Vd converted into the d-axis coordinate on the rotor shaft in the motor 5. This excitation component voltage Vd is input to the dq/uvw conversion unit 48 and the position and speed estimation unit 42. In addition, based on a difference between the limit value Iqref and the torque component current Iq, the current control unit 47 calculates the torque component voltage Vq converted into the q-axis coordinate on the rotor shaft in the motor 5. This torque component voltage Vq is input to the dq/uvw conversion unit 48 and the position and speed estimation unit 42.

The dq/uvw conversion unit 48 outputs a U phase control signal Vpu, a V phase control signal Vpv and a W phase control signal Vpw as basic signals of PWM signals.

A dead time generation unit 50 performs a dead time correction process on the U phase control signal Vpu, and outputs U phase drive signals Vpuu and Vpud. In addition, the dead time generation unit 50 performs the dead time correction process on the V phase control signal Vpv, and outputs V phase drive signals Vpvu and Vpvd. In addition, the dead time generation unit 50 performs the dead time correction process on the W phase control signal Vpw, and outputs W phase drive signals Vpwu and Vpwd. This process performed by the dead time generation unit 50 will be described in detail later with reference to FIGS. 2 to 11.

A gate terminal of the switching element Q1 in the upper arm of the U phase receives the U phase drive signal Vpuu, and a gate terminal of the switching element Q2 in the lower arm of the U phase receives the U phase drive signal Vpud. A gate terminal of the switching element Q3 in the upper arm of the V phase receives the V phase drive signal Vpvu, and a gate terminal of the switching element Q4 in the lower arm of the V phase receives the V phase drive signal Vpvd. A gate terminal of the switching element Q5 in the upper arm of the W phase receives the W phase drive signal Vpwu, and a gate terminal of the switching element Q6 in the lower arm of the W phase receives the W phase drive signal Vpwd.

Based on these drive waveform signals, the switching elements Q1 to Q6 of the inverter circuit 30 are turned on and off.

As described above, in the present embodiment, the motor control unit 40 executes the PWM control of the switching elements Q1 to Q6 provided in the current path of the motor 5, such that the excitation component current and the torque component current in the motor 5 obtained based on the currents detected at the shunt resistors 63 to 65 become the limit values.

The motor control unit 40 executes control for initial driving operation until the rotation speed of the rotor becomes equal to or higher than a prescribed speed. After the rotation speed of the rotor becomes equal to or higher than the prescribed speed, the motor control unit 40 executes control for sensorless operation. The sensorless operation is the operation of estimating the rotor position and the rotor rotation speed based on the motor current and the like and rotating the motor based on this estimated value, without using a rotation speed sensor such as a resolver for detecting the rotor position of the motor. As the control for the sensorless operation, closed-loop speed control using the above-described position and speed estimation unit 42 and speed control unit 44 is executed.

With the above-described configuration, based on the command speed, the switching elements Q1 to Q6 of the inverter circuit 30 are controlled and the DC current is converted into a three-phase AC current, and the three-phase AC current converted by the inverter circuit 30 is supplied to the coils 6, 7 and 8 of the respective phases of the motor 5. The motor 5 of the electrically-driven compressor is driven by this three-phase AC current.

In FIG. 1, the inverter circuit 30 is connected to the battery (DC power supply) 1. Instead of this, an AC voltage of an AC power supply may be converted into a DC voltage and the DC voltage may be supplied to the inverter circuit 30.

The shunt resistors 63 to 65 are used as current detection means. Instead of the shunt resistors, current transformers may be used.

[PWM Control and Dead Time Correction]

Based on the input estimated rotor position, the input excitation component voltage Vd and the input torque component voltage Vq, the dq/uvw conversion unit 48 in FIG. 1 calculates drive voltages Vu, Vv and Vw for the coils 6, 7 and 8 of the respective phases of the motor 5, and generates drive waveform signals (PWM signals) required to obtain the drive voltages Vu, Vv and Vw.

Figure 2:
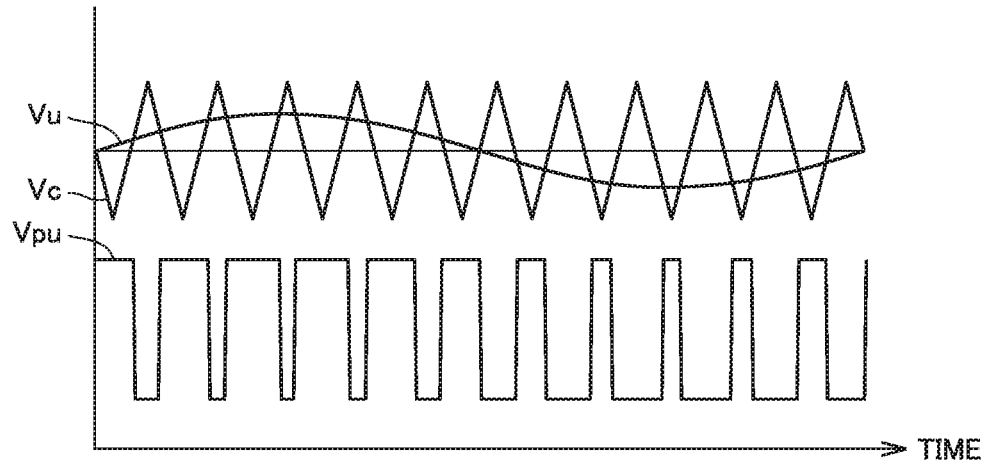
FIG. 2 is a waveform diagram showing a voltage generated by PWM control.

FIG. 2 is a waveform diagram showing the voltage generated by the PWM control. FIG. 2 shows a waveform of the U phase as a typical example of the U, V and W phases. While the U phase will be described below, a similar process is also performed on the V phase and the W phase.

Referring to FIGS. 1 and 2, the dq/uvw conversion unit 48 modulates the calculated drive voltage Vu with a carrier signal Vc, and outputs the U phase control signal Vpu. The dead time generation unit 50 performs the dead time correction process on the U phase control signal Vpu, and outputs the U phase drive signals Vpuu and Vpud. At this time, the actual motor voltage Vu differs between when the sign of a motor current Iu is positive and when the sign of the motor current Iu is negative.

Figure 3:
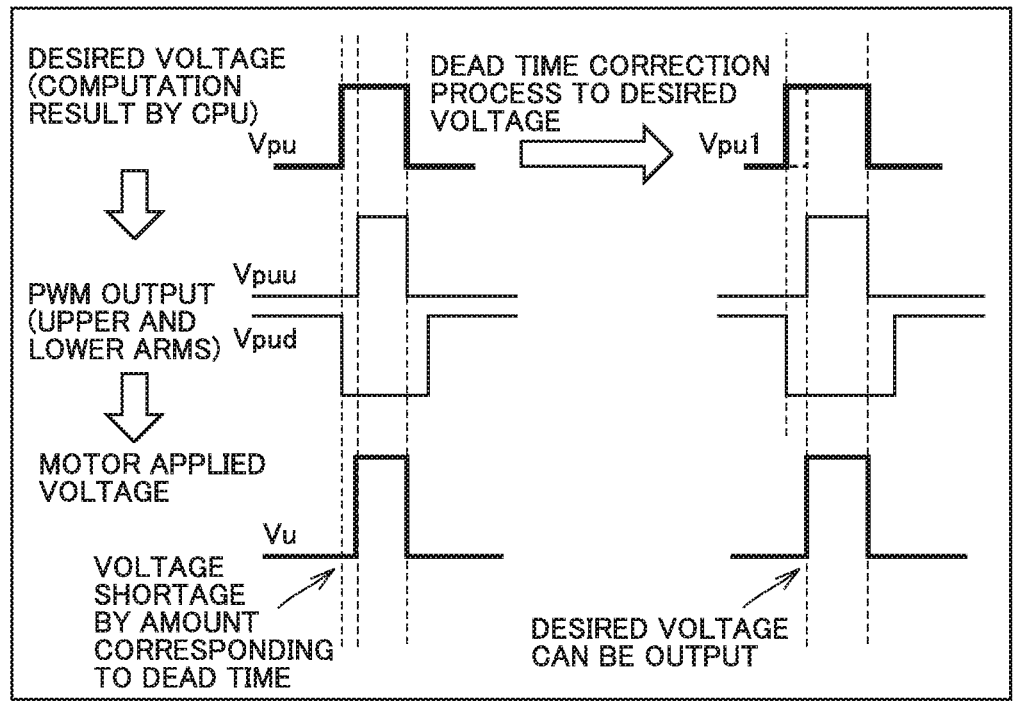
FIG. 3 is a diagram for describing a relation between a control signal Vpu and a motor applied voltage Vu when a motor current has a positive value.

FIG. 3 is a diagram for describing a relation between the control signal Vpu and the motor applied voltage Vu when the motor current has a positive value. Referring to FIG. 3, the control signal Vpu corresponds to a voltage desired to be output to the motor and has a value computed by a CPU in accordance with PWM control. Based on the control signal Vpu, Vpuu and Vpud are made such that the dead time period (time period in which the upper arm and the lower arm are simultaneously turned off) is generated. The direction of the arrow of the current Iu in FIG. 1 is defined as positive. Then, when the motor current Iu>0, the positive current Iu continues to flow due to an L component of the motor coils, even during the dead time period in which the switching elements are turned off. At this time, the diode D2 in FIG. 1 connected in antiparallel with the switching element is brought into conduction, and thus, the dead time period appears as a low level period of the motor applied voltage Vu. Therefore, the process of widening the pulse width by an amount corresponding to the dead time is performed on the control signal Vpu, to thereby generate a control signal Vpu1 and generate the drive signals Vpuu and Vpud based on this control signal Vpu1. As a result, the voltage desired to be output to the motor can be output as the motor applied voltage Vu.

Figure 4:
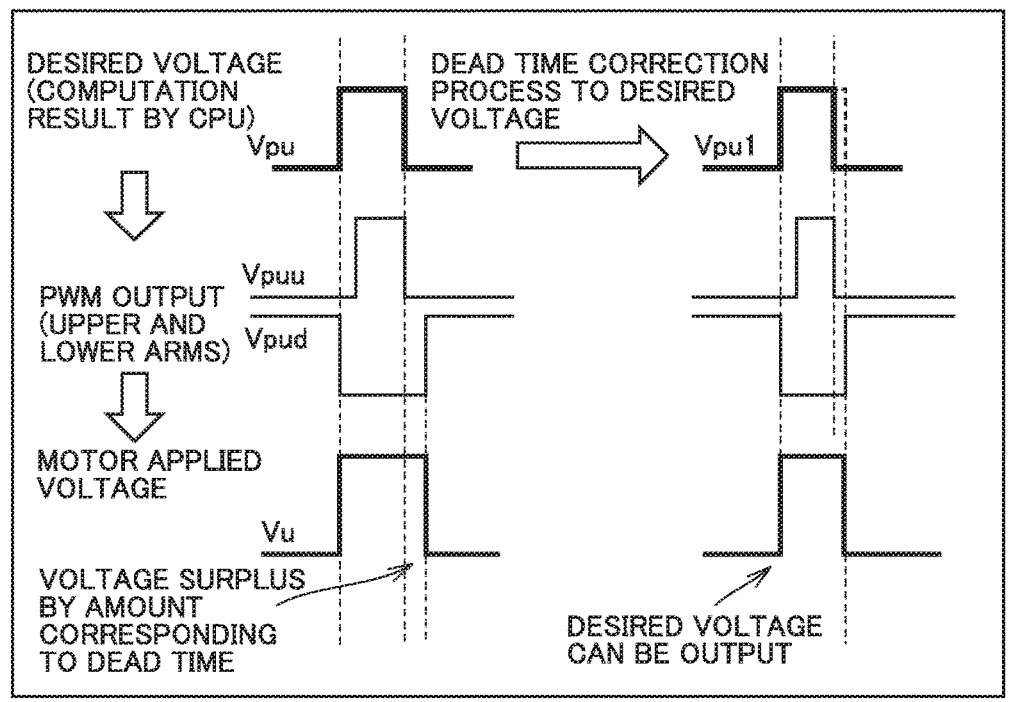
FIG. 4 is a diagram for describing a relation between the control signal Vpu and the motor applied voltage Vu when the motor current has a negative value.

FIG. 4 is a diagram for describing a relation between the control signal Vpu and the motor applied voltage Vu when the motor current has a negative value. Referring to FIG. 4, the control signal Vpu corresponds to a voltage desired to be output to the motor and has a value computed by the CPU in accordance with PWM control. Based on the control signal Vpu, Vpuu and Vpud are made such that the dead time period (time period in which the upper arm and the lower arm are simultaneously turned off) is generated. The direction of the arrow of the current Iu in FIG. 1 is defined as positive. Then, when the motor current Iu<0, the negative current Iu continues to flow due to the L component of the motor coils, even during the dead time period in which the switching elements are turned off. At this time, the diode D1 in FIG. 1 connected in antiparallel with the switching element is brought into conduction, and thus, the dead time period appears as a high level period of the motor applied voltage Vu. Therefore, the process of narrowing the pulse width by an amount corresponding to the dead time is performed on the control signal Vpu, to thereby generate the control signal Vpu1 and generate the drive signals Vpuu and Vpud based on this control signal Vpu1. As a result, the voltage desired to be output to the motor can be output as the motor applied voltage Vu.

The dead time correction process described with reference to FIGS. 3 and 4 does not particularly cause problems when the motor current does not cross zero during the control cycle. However, when the motor current crosses zero during the control cycle, it is a problem whether to perform the process in FIG. 3 or the process in FIG. 4.

Figure 5:
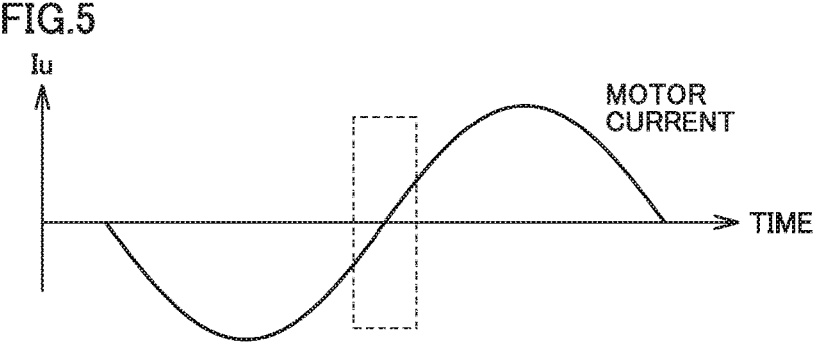
FIG. 5 is a diagram showing a portion where the motor current crosses zero.
Figure 6:
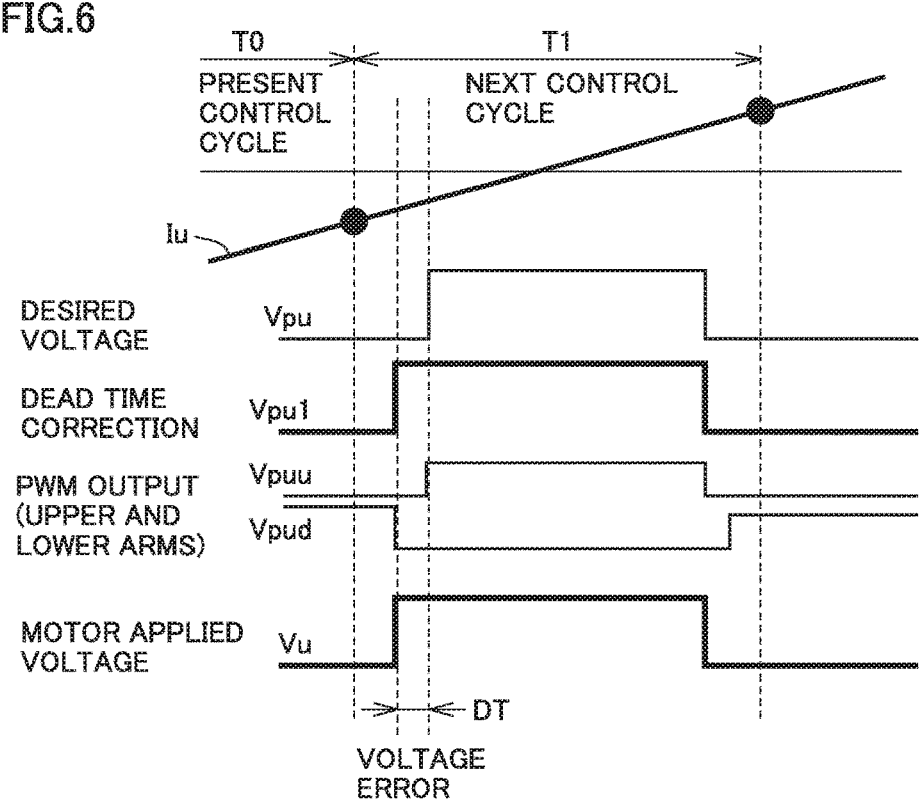
FIG. 6 is an enlarged view of a dashed portion in FIG. 5, with control signals being added.

FIG. 5 is a diagram showing a portion where the motor current crosses zero. FIG. 6 is an enlarged view of a dashed portion in FIG. 5, with the control signals being added.

A present control cycle is defined as T1 and a next control cycle is defined as T1. In the first half of the control cycle T1, Iu<0. In the latter half, Iu>0. In this case, when the voltage Vpu1 subjected to dead time correction is generated as shown in FIG. 6, the first half of the dead time is included in the high level period of the applied voltage Vu and the latter half of the dead time is included in the low level period of the applied voltage Vu. When the voltage Vpu1 subjected to correction is generated as shown in FIG. 6, a voltage error DT occurs in the motor applied voltage Vu.

In order to reduce the influence of this voltage error DT as small as possible, the dead time generation unit 50 in FIG. 1 determines whether the present control timing (boundary point between T0 and T1) is close to or far from the zero-crossing point, when the motor current is expected to cross zero in the next control cycle T1 in light of the control timing. When the present control timing is close to the zero-crossing point, the dead time generation unit 50 in FIG. 1 makes correction as usual. When the present control timing is far from the zero-crossing point, the dead time generation unit 50 in FIG. 1 does not make correction. Instead of not making correction, a correction amount may be set at an intermediate value between plus and minus, and the PWM waveform width may be set at an intermediate value between a PWM waveform width when correction is made as usual and a PWM waveform width when correction is delayed and correction is made with the reverse sign.

Figure 7:
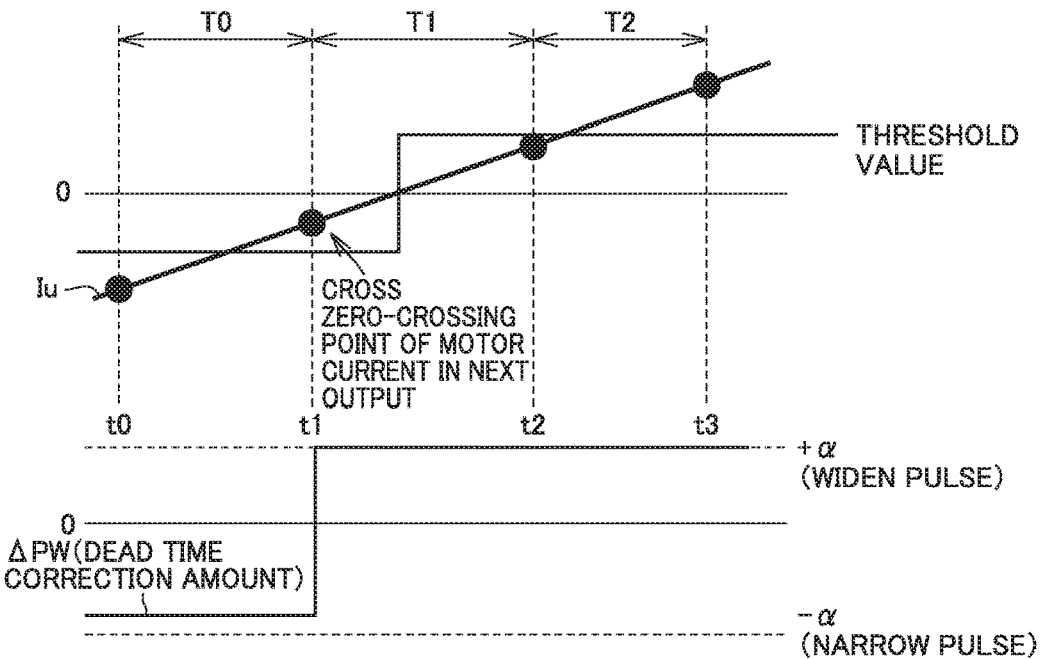
FIG. 7 is a waveform diagram of a first example showing control cycles and a correction amount before and after the current Iu crosses zero in the present embodiment.
Figure 8:
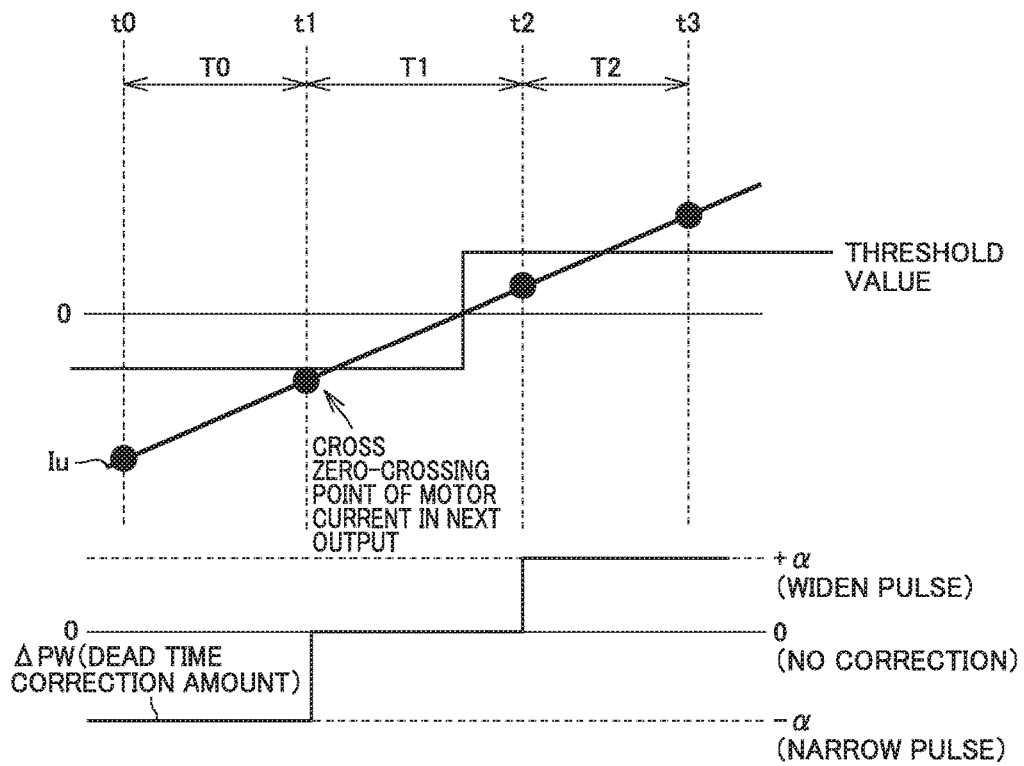
FIG. 8 is a waveform diagram of a second example showing the control cycles and the correction amount before and after the current Iu crosses zero in the present embodiment.

FIG. 7 is a waveform diagram of a first example showing the control cycles and the correction amount before and after the current Iu crosses zero in the present embodiment. FIG. 8 is a waveform diagram of a second example showing the control cycles and the correction amount before and after the current Iu crosses zero in the present embodiment.

Referring to FIGS. 1 and 7, the dead time generation unit 50 obtains the frequency information of the current Iu from the position and speed estimation unit 42. The dead time generation unit 50 also obtains the motor current value from the shunt resistor 65.

Based on the control cycle and the frequency information, the dead time generation unit 50 determines whether or not the next control cycle is a control cycle after the current Iu crosses zero. When the next control cycle is a time period before the current Iu crosses zero (control cycle T0), a dead time correction amount ΔPW is not switched and the original sign is maintained (correction amount −α). When the next control cycle is a time period in which the current Iu crosses zero (control cycle T1), the dead time generation unit 50 determines whether to switch the dead time correction amount ΔPW.

As shown in FIG. 7, when an absolute value of the motor current value Iu at time t1 is smaller than a threshold value, the zero-crossing point is closer to time t1 than time t2. In this case the dead time correction amount ΔPW is switched from −α to +α as usual.

In contrast, as shown in FIG. 8, when the absolute value of the motor current value Iu at time t1 is greater than the threshold value the zero-crossing point is closer to time t2 than time t1. In this case, if the sign of the dead time correction amount ΔPW is switched immediately, distortion is great (it takes time to recover). Therefore, the dead time correction amount ΔPW in the control cycle T1 is set at zero (or a value smaller than α), thereby setting the pulse width to be intermediate between a pulse width when dead time correction is made using the correction amount with the original sign (when the correction amount ΔPW in the control cycle T1=−α) and a pulse width when dead time correction is made using the correction amount with the reversed sign (FIG. 7). As a result, the waveform distortion of the motor current is reduced as compared with the conventional art.

As shown in FIG. 7, when the absolute value of the motor current value Iu is smaller than the threshold value (time t1 is close to the zero-crossing point), the sign of the current correction amount may be switched immediately because the waveform distortion of the motor current can be reduced as compared with the case of setting the correction amount at zero or the case of making correction without switching the sign.

Figure 9:
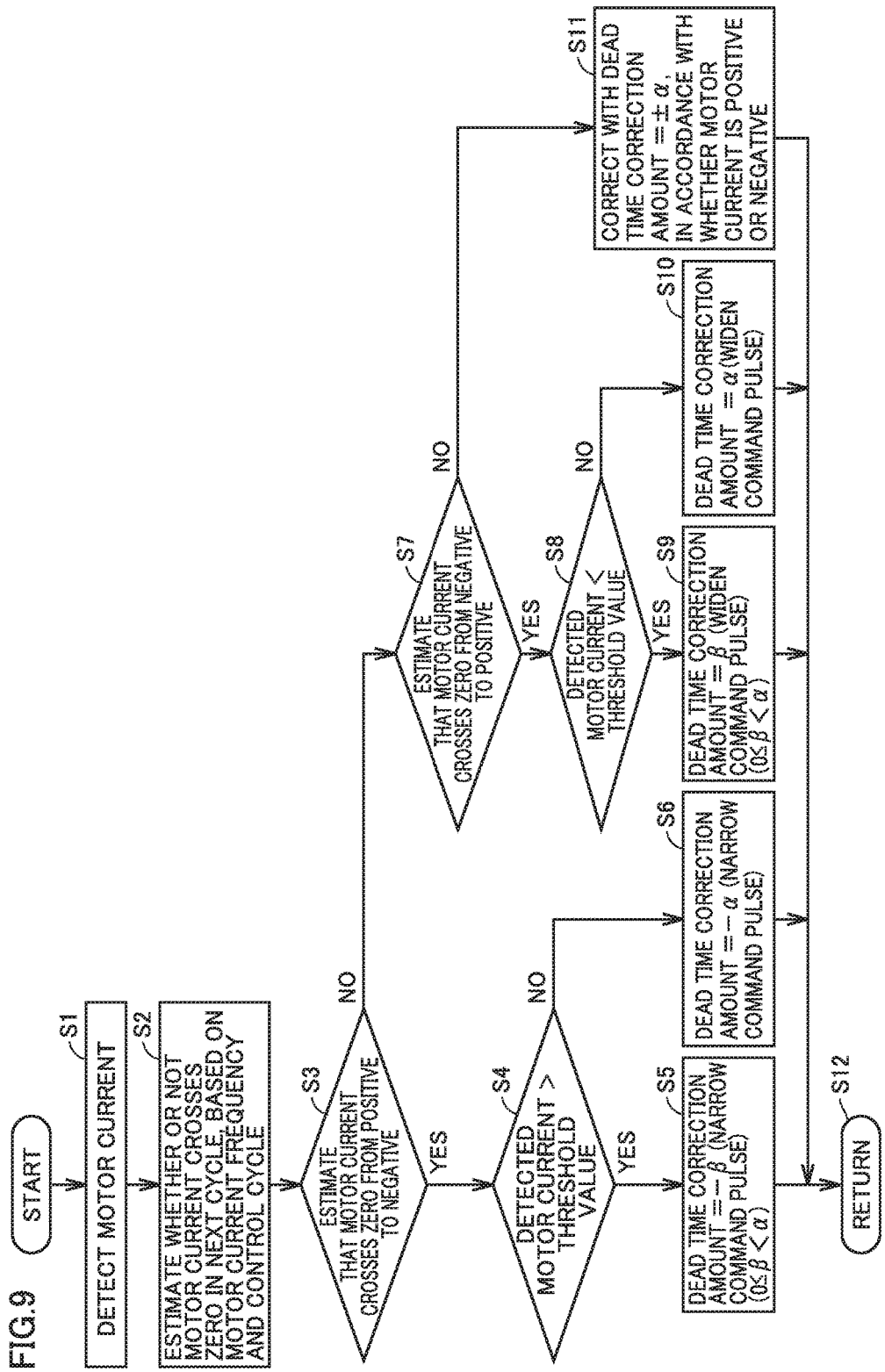
FIG. 9 is a flowchart for describing correction control executed by a dead time generation unit.

FIG. 9 is a flowchart for describing correction control executed by the dead time generation unit.

Referring to FIGS. 1 and 9, when the process is first started, the dead time generation unit 50 detects the motor currents Iu, Iv and Iw in step S1.

Next, in step S2, based on the motor current frequency and the control cycle (fixed value determined by the system), the dead time generation unit 50 performs the processing for estimating whether or not the motor current crosses zero in the next control cycle.

A present rotation phase θ can be estimated from the value of the motor current Iu and the signs of the motor currents Iv and Iw. In addition, it is preliminarily known that one control cycle corresponds to a rotation phase Δθ. Therefore, when θ<180°<θ+Δθ is satisfied, the motor current crosses zero. In addition, when θ<360°<θ+Δθ is satisfied, the motor current also crosses zero.

Next, in step S3, the dead time generation unit 50 determines whether or not the motor current Iu is estimated to cross the zero-crossing portion from positive to negative.

Figure 10:
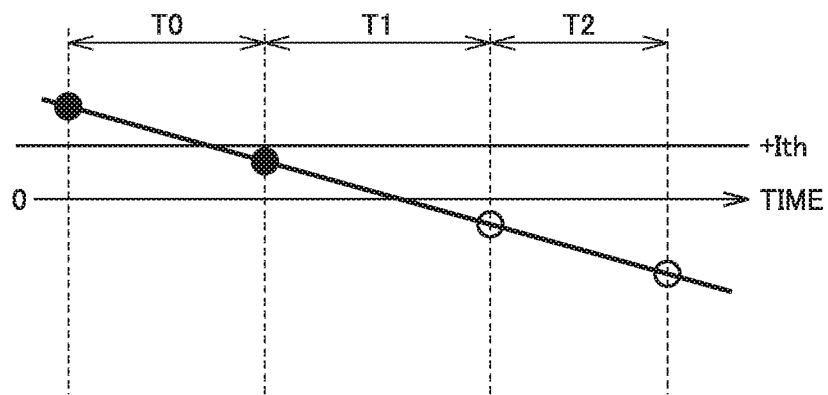
FIG. 10 is a waveform diagram showing the case in which the motor current crosses the zero-crossing portion from positive to negative.

FIG. 10 is a waveform diagram showing the case in which the motor current crosses the zero-crossing portion from positive to negative. In FIG. 10, by the end of the control cycle T0, the dead time generation unit 50 determines whether or not the motor current Iu crosses the zero-crossing portion from positive to negative in the next control cycle T1. A rotation phase at the timing of the end of the control cycle T0 is defined as θ and a rotation phase at the timing of the end of the control cycle T1 is defined as θ+Δθ. Then, when the motor current crosses the zero-crossing portion from positive to negative, θ<180°<θ+Δθ is satisfied.

Referring again to FIG. 9, if it is estimated in step S3 that the motor current Iu crosses the zero-crossing portion from positive to negative, the process proceeds to step S4. If not, the process proceeds to step S7.

When the process proceeds to step S4, the dead time generation unit 50 determines whether or not the detected motor current Iu is greater than a threshold value Ith. If Iu>Ith is satisfied in step S4 the process proceeds to step S5. If Iu>Ith is not satisfied, the process proceeds to step S6. FIG. 10 shows the case in which the current Iu<Ith is satisfied at the control timing of the end of the control cycle T0, and thus, the process proceeds to step S6.

When the process proceeds to step S5, the dead time generation unit 50 sets the dead time correction amount at −β. Here, a standard dead time correction amount is defined as α (α is a positive value). Then, β is zero or a positive value smaller than α (0≤β<α). The dead time correction amount being zero or a negative value means that correction is made so as not to change the width of the command pulse or so as to narrow the width of the command pulse.

On the other hand, when the process proceeds to step S6, the dead time generation unit 50 sets the dead time correction amount at −α. In this case, the dead time correction amount is a negative value, and thus, correction is made so as to narrow the width of the command pulse.

When the process proceeds to step S7, the dead time generation unit 50 determines whether or not the motor current Iu is estimated to cross the zero-crossing portion from negative to positive.

Figure 11:
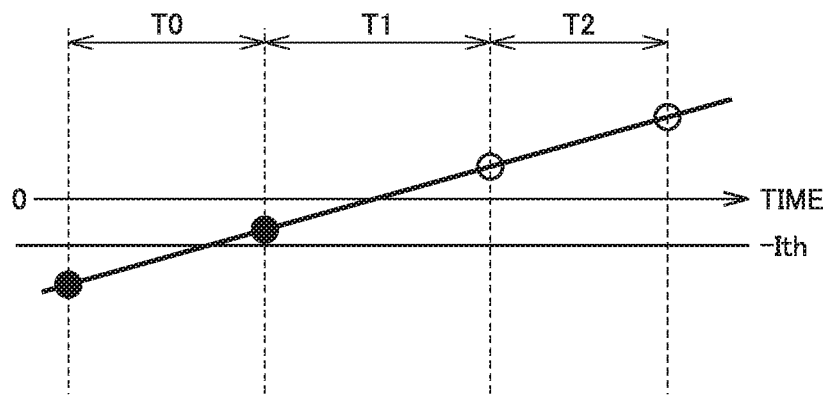
FIG. 11 is a waveform diagram showing the case in which the motor current crosses the zero-crossing portion from negative to positive.

FIG. 11 is a waveform diagram showing the case in which the motor current crosses the zero-crossing portion from negative to positive. In FIG. 11, at the end of the control cycle T0, the dead time generation unit 50 determines whether or not the motor current Iu crosses the zero-crossing portion from negative to positive in the next control cycle T1. A rotation phase at the timing of the end of the control cycle T0 is defined as θ and a rotation phase at the timing of the end of the control cycle T1 is defined as θ+Δθ. Then, when the motor current crosses the zero-crossing portion from negative to positive, θ<360°<θ+Δθ is satisfied.

Referring again to FIG. 9, if it is estimated in step S7 that the motor current Iu crosses the zero-crossing portion from negative to positive, the process proceeds to step S8. If not, the process proceeds to step S11.

When the process proceeds to step S8, the dead time generation unit 50 determines whether or not the detected motor current Iu is smaller than a threshold value −Ith. If Iu<−Ith is satisfied in step S8, the process proceeds to step S9. If Iu<−Ith is not satisfied, the process proceeds to step S10. FIGS. 7 and 11 show the case in which the current Iu>−Ith is satisfied at the end of the control cycle T0, and thus, the process proceeds to step S10. On the other hand, in the case shown in FIG. 8, the process proceeds to step S9.

When the process proceeds to step S9, the dead time generation unit 50 sets the dead time correction amount at +β. Here, a standard dead time correction amount is defined as α (α is a positive value). Then, β is zero or a positive value smaller than α (0≤β<α). The dead time correction amount being a positive value means that correction is made so as not to change the width of the command pulse or so as to widen the width of the command pulse.

On the other hand when the process proceeds to step S10, the dead time generation unit 50 sets the dead time correction amount at +α. In this case the dead time correction amount is a positive value, and thus, correction is made so as to widen the width of the command pulse.

Finally, the case of the process proceeding from step S7 to step S11 will be described. In this case, the motor current Iu does not cross zero in the next control cycle. Therefore, when the motor current is positive the dead time correction amount is set at +α, and when the motor current is negative, the dead time correction amount is set at −α.

When the dead time correction amount is determined by the processing in any of steps S5, S6 and S9 to S11, the process is returned to the main routine in step S12.

FIG. 8 shows, by way of example, the case of the correction amount β=0 in the above-described flowchart. However, β does not necessarily need to be zero as long a β is a positive value smaller than α.

Referring again to FIG. 1, the present embodiment will be summarized. The electrically-driven compressor includes the motor 5, the scroll compressor 9, the inverter circuit 30, and the motor control unit 40. The scroll compressor 9 corresponds to "refrigerant compressing unit" driven by the motor 5. The inverter circuit 30 drives the motor 5. The motor control unit 40 corresponds to "control device" for controlling the inverter circuit 30 by the PWM control.

As shown in FIGS. 7 and 8, when the magnitude |Iu| of the motor current Iu is smaller than the threshold value at the control timing (t1) when the polarity of the motor current Iu is expected to be reversed after the elapse of one control cycle (T1) (FIG. 7), the motor control unit 40 sets the correction amount of the width of the pulse generated by the PWM control at the first correction amount (+α), and when the magnitude |Iu| of the motor current is greater than the threshold value at the above-described timing (FIG. 8), the motor control unit 40 sets the correction amount of the width of the pulse generated by the PWM control at zero or the value β smaller than the first correction amount (S5 or S9 in FIG. 9).

When the magnitude of the motor current is smaller than the threshold value at the above-described control timing, the above-described control timing (t1 in FIG. 7) is closer to the zero-crossing point than the next control timing (t2 in FIG. 7), and thus, correction may be made with the first correction amount (+α or −α) which is a standard value. On the other hand, when the magnitude of the motor current is greater than the threshold value, the above-described control timing (t1 in FIG. 8) is far from the zero-crossing point than the next control timing (t2 in FIG. 8), and thus, the voltage error of the voltage applied to the motor is great if correction is made with the first correction amount (+α or −α) which is a standard value. Thus, when the magnitude of the motor current is greater than the threshold value, correction is not made or the correction amount is set at the value β smaller than the first correction amount (S5 or S9 in FIG. 9), and as a result, the voltage error can be suppressed small.

While the embodiment of the present invention has been described above, the embodiment disclosed herein is illustrative and non-restrictive in every respect. The scope of the present invention is defined by the terms of the claims, and is intended to include any modifications within the meaning and scope equivalent to the terms of the claims.

What is claimed is:

1. An electrically-driven compressor for a vehicle comprising:
    a motor;
    a refrigerant compressing unit driven by the motor;
    an inverter configured to drive the motor; and
    a control device configured to control the inverter by pulse width modulation (PWM) control,
    when a magnitude of a current of the motor is smaller than a threshold value at a control timing, the control device being configured to set a correction amount of a width of a pulse generated by the PWM control at a first correction amount, the control timing being a timing when a polarity of the current of the motor is reversed after an elapse of one control cycle,
    when the magnitude of the current of the motor is greater than the threshold value at the control timing, the control device being configured to set the correction amount of the width of the pulse generated by the PWM control at zero or a value smaller than the first correction amount,
    during increase in a current value of the motor and during a period from a time point at which the current value indicates a negative local minimum value to a time point immediately preceding the control timing, the control device being configured to set the correction amount of the width of the pulse at the first correction amount,
    during the increase in the current value of the motor and during a period from thea time point immediately following the control timing to a time point at which the current value indicates a positive local maximum value, the control device being configured to set the correction amount of the width of the pulse at the first correction amount,
    during decrease in the current value of the motor and during a period from the time point at which the current value indicates the positive local maximum value to the time point immediately preceding the control timing, the control device being configured to set the correction amount of the width of the pulse at the first correction amount, and
    during the decrease in the current value of the motor and during a period from attic time point immediately following the control timing to the time point at which the current value indicates the negative local minimum value, the control device being configured to set the correction amount of the width of the pulse at the first correction amount.

2. The electrically-driven compressor according to claim 1, wherein
when the current of the motor is negative at a timing other than the control timing, the control device is configured to set the first correction amount to cause the width of the pulse to be narrowed.

3. The electrically-driven compressor according to claim 1, wherein
when the current of the motor is positive at a timing other than the control timing, the control device is configured to set the first correction amount to cause the width of the pulse to be widened.

4. The electrically-driven compressor according to claim 3, wherein
when the current of the motor is negative at a timing other than the control timing, the control device is configured to set the first correction amount to cause the width of the pulse to be narrowed.

* * * * *